Sept. 8, 1970 R. P. MUTTICK ET AL 3,527,900

STEREOPHONIC PHONOGRAPH PICKUPS HAVING A PAIR OF VERTICALLY ORIENTATED BENDER-TYPE BEAM TRANSDUCERS AND FORCE CHANGING COUPLER

Filed Dec. 11, 1968

3 Sheets-Sheet 1

INVENTORS
RICHARD P. MUTTICK
WILLIAM F. KNAUERT

By

OSTROLENK, FABER, GERB & SOFFEN
ATTORNEYS

STEREOPHONIC PHONOGRAPH PICKUPS HAVING A PAIR OF VERTICALLY ORIENTATED BENDER-TYPE BEAM TRANSDUCERS AND FORCE CHANGING COUPLER

Filed Dec. 11, 1968

INVENTORS
RICHARD P. MUTTICK
WILLIAM F. KNAUERT
BY
OSTROLENK, FABER, GERB & SOFFEN
ATTORNEYS

FIG. 10
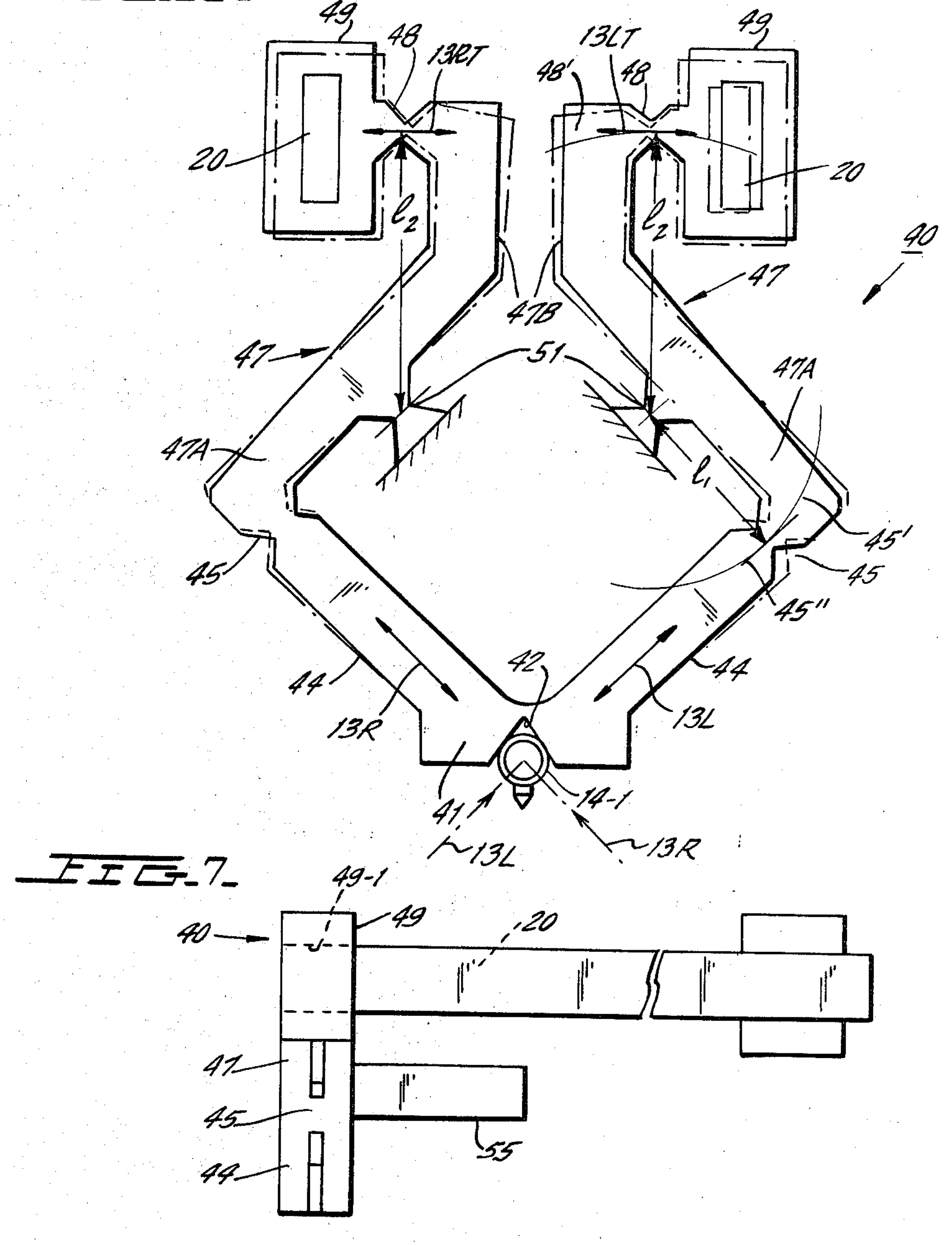
FIG. 10, FIG. 7
FIG. 8
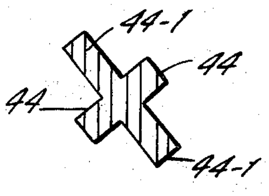
FIG. 9
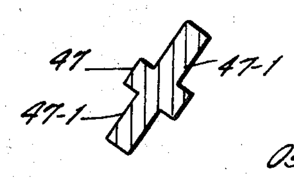
INVENTORS
RICHARD P. MUTTICK
WILLIAM F. KNAUERT
BY
OSTROLENK, FABER, GERB & SOFFEN
ATTORNEYS United States Patent Office 3,527,900

Patented Sept. 8, 1970

3,527,900

STEREOPHONIC PHONOGRAPH PICKUPS HAVING A PAIR OF VERTICALLY ORIENTED BENDER-TYPE BEAM TRANSDUCERS AND FORCE CHANGING COUPLER

Richard P. Muttick, Yorktown Heights, and William F. Knauert, Yonkers, N.Y., assignors to Sonotone Corporation, Elmsford, N.Y., a corporation of New York Filed Dec. 11, 1968, Ser. No. 782,847
Int. Cl. H04r *1/16, 17/08;* G11b *3/10*
U.S. Cl. 179—100.41 9 Claims

ABSTRACT OF THE DISCLOSURE

A stereophonic phonograph pickup for utilization in conjunction with 45–45 records, in which the transducers for the individual channels of information are vertically orientated in parallel planes. The transducers are of the bender type, beam shaped variety requiring a horizontal motion input, substantially perpendicular to the extended beam surface, to efficiently drive the transducer. A motion resolving and force changing coupler is provided between the stylus rod and the vertically orientated bender-type transducers for separating the record induced undulations, and thereafter efficiently converting the 45–45 components to drive forces directed perpendicular to the transducer plane.

This invention relates to stereophonic phonograph pickups having mechano-electric transducers, operating with bender-type vibratory modes in a direction perpendicular to its extended beam surface. More particularly, the stereophonic phonograph pickup is intended to operate in conjunction with the well known type of 45–45 stereophonic recording, wherein the two channels of information contained in the record groove provide stylus undulations in orthogonally related directions, inclined 45° to the surface of the record.

Since the advent of the well known 45–45 stereophonic recording system, most of the widely used commercial stereophonic phonograph pickups operating with two beam-shaped bender-type mechano-electric vibration transducers have mounted the two transducer beams with their beam planes inclined substantially 45° to the surface of the record. The separate channels of information are transmitted from the stylus rod to these transducers by a V-shaped motion resolving coupler, the center of which is coupled to and driven by the groove engaging stylus assembly. The motion resolving coupler separates the individual channels of information, and transmits the vibratory forces along substantially straight lines, as input driving forces perpendicular to the inclined extended beam surfaces. The mounting of the transducers in a direction inclined 45° with respect to the record surface has caused difficulties in cartridge manufacture and has also placed limitations on the extent to which the cartridge dimensions may be minimized. As to the former difficulty, it is a common expedient to fabricate the pickup housing of two principal components, a main body and a cover. The transducers are typically inserted within suitable slots in the main body portion, with the cover then being added and permanently secured as by rivets. Since the mating surface of the cover and the main body portion is typically along the horizontal, the slots for the reception of the transducer had to be inclined 45° to this surface. This has complicated the tooling requirements and molding techniques and the subsequent location of the transducers. It would, therefore, be advantageous to provide an efficient pickup design, in which the slots for the reception of the transducer extend in a direction perpendicular to the parting line of the mold.

In the past some attempt to alleviate this problem has been proposed in constructing stereophonic pickups operating with twister-type piezoelectric transducers, wherein the stylus imparts a twisting vibratory motion with respect to the transducer torsional axis for generating the electrical signal output. Such structures are typically shown in U.S. Pat. Nos. 2,997,548, 3,002,056, 3,026,382, and 3,178,520. The twister type transducer, and the manner of coupling the signals thereto, has introduced certain inherent disadvantages not present in bender-type transducer systems. It has, therefore, long been desired to manufacture a stereo phonograph pickup with two bender-type beam transducers, orientated with their beam planes parallel to each other, and extending substantially 90° to the record surface, with the stylus undulations being efficiently and individually coupled to the transducers. Up until the present invention, the previously available resolver couplers did not permit this.

In accordance with our invention, a unique resolver coupler is provided, which efficiently converts the 45–45 vibratory motion of the stylus to a pair of transducer drive signals directed perpendicular to the extended beam surface of the bender type transducer.

Basically, the motion resolving and direction changing coupler of our invention includes a first V-shaped stylus coupler portion corresponding in function to the V-shaped resolvers of the prior art. That is, this portion serves to resolve the composite 45–45 motion imparted to the stylus by the record groove into two distinct orthogonally directed motion components, with the stylus motion component coupled to either arm of the V-shaped resolver portion being effected without substantially disturbing the component stylus motion coupled to the other 45° inclined coupler link. Interconnected to this stylus coupler is a transducer drive portion which serves to efficiently convert the direction of the 45° inclined force to a horizontal movement perpendicular to the extended beam surface. The transducer drive portion is substantially rigid, and includes first and second link portions joined at the intermediate portions and connected to a stationary bearing pivot of the pickup housing. Each of the link portions includes a hinge type pivot at its free end. The free end of the first link portion is connected to the 45° inclined arm of the V-shaped resolver section. The free end of the second link portion is connected to the transducer beam. By means of a unique configuration of the rigid linkage, and particularly the location of the end pivots with respect to the stationary bearing pivots, the input 45–45 inclined vibratory motion is efficiently converted to horizontal forces directed perpendicular to the extended beam surface.

It is, therefore, seen that a basic object of the instant invention is to provide an improved stereophonic phonograph pickup structure operating with bender-type beam transducers.

A further object of the instant invention is to provide a stereophonic phonograph pickup having a pair of bender-type beam transducers, orientated in parallel planes, perpendicular to the record surface.

Another object of the instant invention is to provide a phonograph pickup design, having a resolver structure for converting 45–45 vibratory motion to a pair of horizontal force components for driving parallel disposed bender type beam transducers.

An additional object of the instant invention is to provide a resolver design for a phonograph pickup, wherein inclined vibratory motion is efficiently converted to a pair of force components for driving parallel orientated bender type beam transducers.

Still a further object is to provide within a phonograph pickup having a main housing body and a complementary cover portion, a pair of parallel directed transducer receiving slots, orientated perpendicular to the mating surfaces of the housing body and cover, and including a motion resolving means for converting 45–45 input signals to transducer drive components parallel to the mating housing surface.

These as well as other objects of our invention will now become readily apparent from the following description and accompanying drawings, in which:

FIG. 1 is a longitudinal cross-sectional view of a phonograph pickup, exemplifying the invention.

FIGS. 2, 3, 4 and 5 are cross-sectional views along the lines 2—2, 3—3, 4—4, and 5—5, respectively, of FIG. 1.

FIG. 7 is a side view of the resolver coupler, and motion converter, utilized in the embodiment in FIGS. 1–6.

Figure 1:
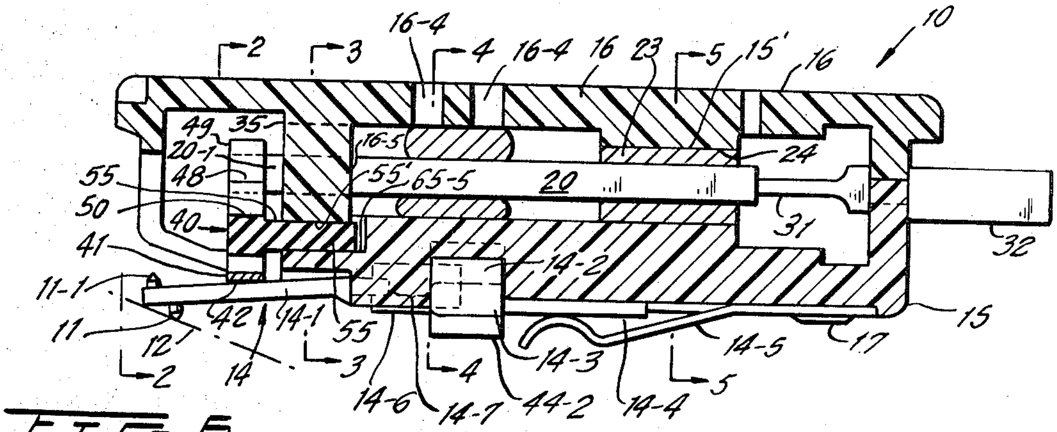
Figure 6:
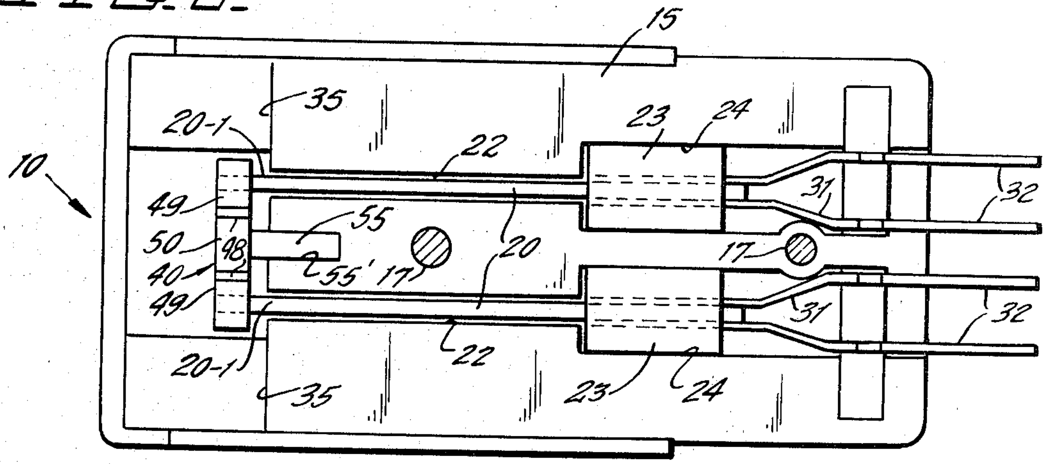
FIG. 6 is a top view, with the housing cover removed, showing the interior of the pickup assembly.
Figure 2:
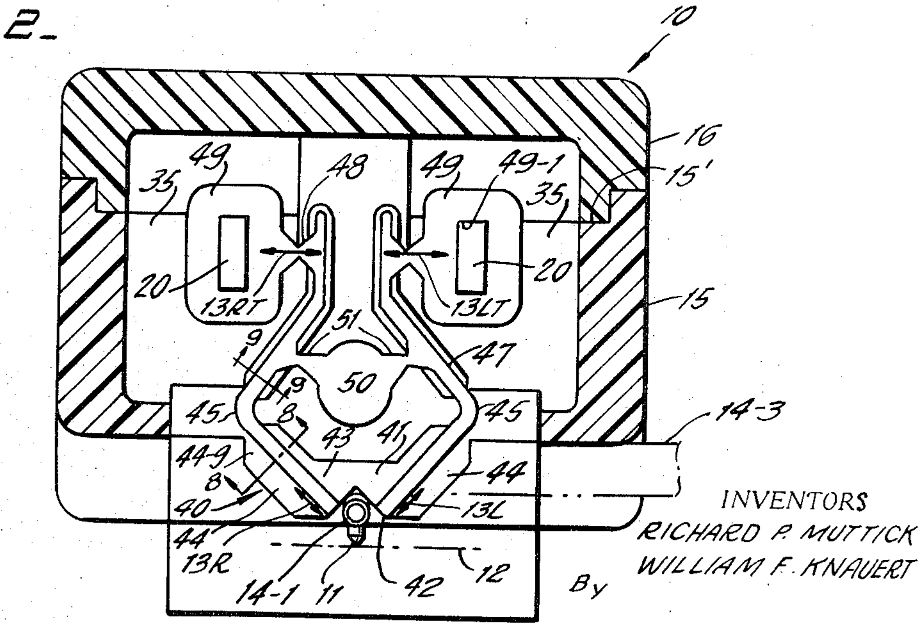
Figures 3, 4:
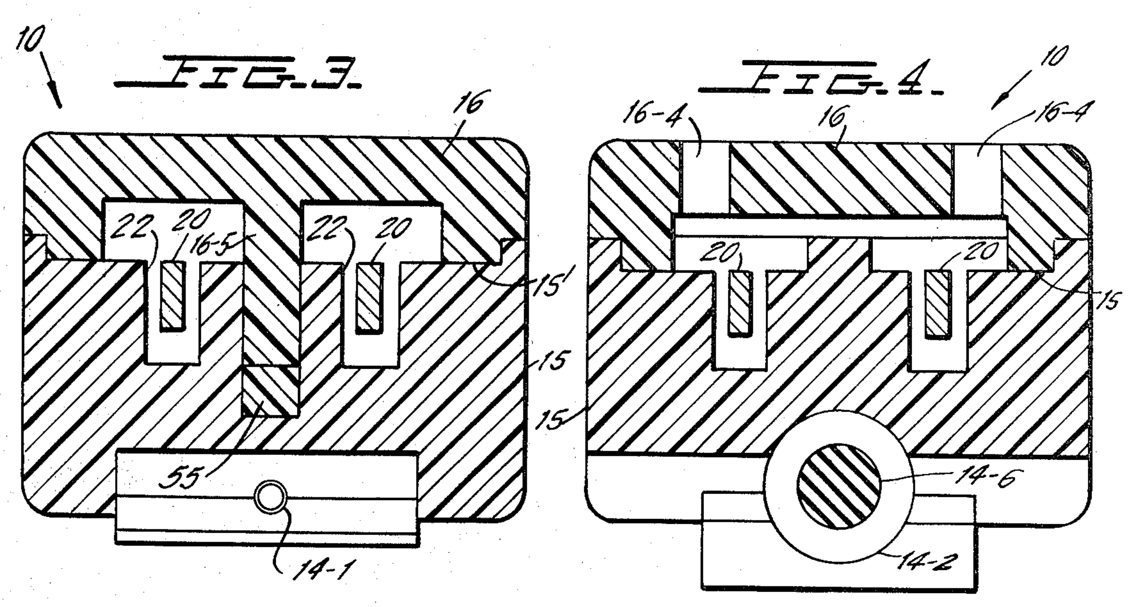
Figure 5:
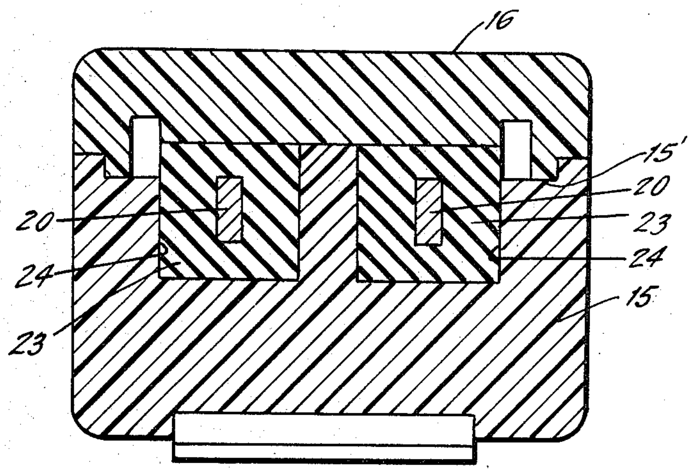

FIGS. 8 and 9 are cross-sectional views along the lines 8—8 and 9—9, of FIG. 2, showing a portion of the resolver construction.

FIG. 10 is an enlarged simplified representation of the resolver coupler and illustrating its manner of operation.

Figure 11:
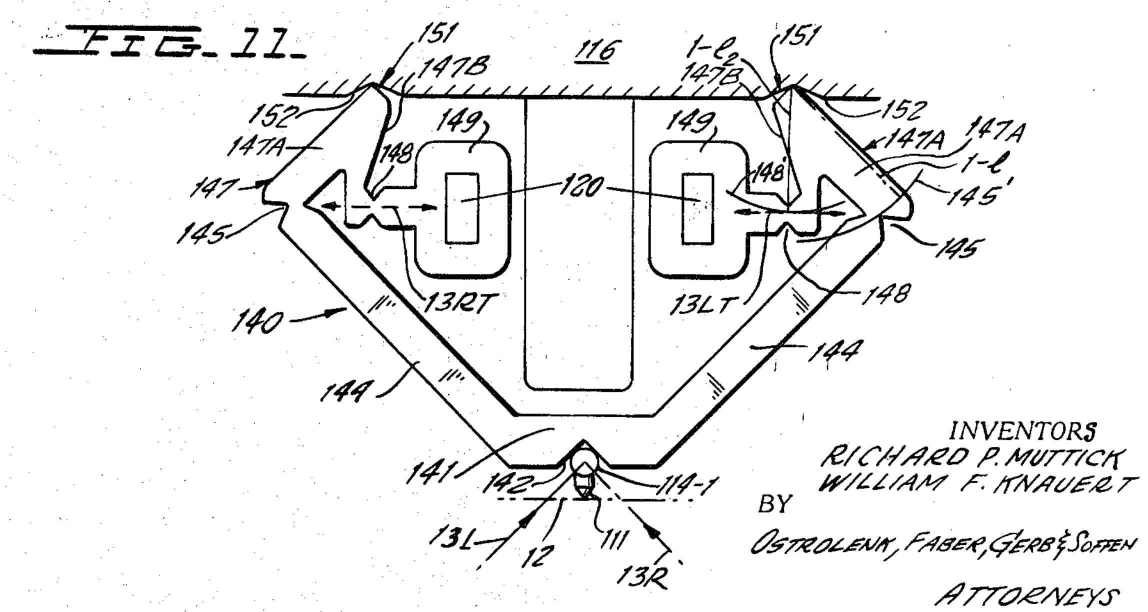

FIG. 11 is another example of the coupler resolver of the instant invention, which may be utilized in conjunction with the same general type of pickup structure, as shown in FIGS. 1–6.

The principles of the invention will now be described in connection with a stereophonic pickup operating with two beam shaped bender-type transducer elements operating with a vibratory beam mode in a direction substantially perpendicular to the plane or major surface of the transducer beam. As an example, the transducer beam may consist of a widely used flat ceramic piezoelectric transducer beam of the type described in connection with FIGS. 1–4 of Koren et al., Pat. No. 2,863,076, which transduces vibrations in a direction perpendicular to its major plane or surface into electric signals or vice versa. However, the invention is not limited to such piezoelectric beam transducers but is also applicable to other types of generally flat beam shaped mechano-electric transducers which transduces vibratory motion in a direction perpendicular to the beam plane into corresponding electric signals, for example, flat beam strain-gauge transducers such as described in U.S. Pats. 3,089,108, 3,034,345 and 3,075,160.

Referring now initially to FIGS. 1–6, there is shown a stereophonic phonograph pickup 10 incorporating the instant invention. Phonograph pickup 10 is intended to be carried at the front end of a tone arm (not shown) for maintaining its stylus 11 in playback engagement with a standard 45–45 record groove, with the surface of the record being indicated by dot-dash line 12. Such stereophonic recordings include two opposite face groove recording surfaces, inclined 45° to the plane 12 of the record surface. Each inclined groove has its own distinct groove undulations for imparting to the stylus two distinct orthogonally related inclined motion components 13L and 13R (see FIGS. 2 and 10).

Pickup 10 comprises a housing which includes a main body portion 15 and a complementary cover 16, joined along a mating surface 15'. The body portions 15 and 16 are suitably secured to each other as by two spaced central rivets 17. The housing 15 and cover 16 may be molded of a suitable polymer material and includes appropriate recesses for the reception of the hereinafter defined operating components.

The housing recesses include two upwardly facing parallel disposed elongated compartments, including portions 22, 24, for the reception of the generally flat bender type mechano-electric transducer beam 20, such that their respective beam planes will be parallel to each other and perpendicular to record surface 12. The two flat beam transducers 20 are held for vibrations in the desired mode with the rear end of each transducer beam 20 being embraced within a thick elastomer clamping body 23. The bodies 23 are compressed with a predetermined limited pressure within the surrounding wider compartment section 24 for assuring that each transducer beam 20 is fixedly held in housing 15 for vibration with the desired mode perpendicular to its major beam plane. These clamping bodies may also serve to provide electrical contact pressure with connection tabs 31 of externally extending terminal strips 32, which are placed against the exterior opposite polarity metallic transducer terminal surfaces of each transducer 20.

The front end 20–1 of each transducer projects beyond the front surfaces 35 of the solid housing cover 16, and is embraced by portion 49 of the resolver 40. In accordance with the instant invention, the front ends 20–1 of the parallel disposed beam-type transducers are coupled to the stylus rod 14–1 by a unique coupler structure 40, which transmits the two inclined stylus motion components 13L, 13R and changes their direction into corresponding transducer drive motion components 13LT and 13RT (FIGS. 2 and 10).

After affixing the two transducer assemblies (20, 23, 32) and the motion resolving coupler 40 within the compartments of the housing 15, the overlying cover wall 16 is affixed to the housing 15, for compressing elastomer body 23 with the desired amount of pressure and causing it to hold transducer 20 in cantilever fashion for vibration in the desired direction.

After completing the pickup assembly, a small quantity of non-creeping fluorinated damping compound is advantageously placed through cover wall opening 16–4 along the portion of each transducer beam 20, which vibrates with a resonant peak amplitude at its resonant frequency. Such desired damping is more fully disclosed in copending application Ser. No. 616,276, filed Feb. 15, 1967, entitled Resonant-Peak Motion of Beam-Shaped Mechano-electric Audio-Frequency Transducers, in the names of Jerome F. Collins and Morris S. Shatavsky, and assigned to the assignee of the present invention.

The stylus 11, which rides within the record groove, is part of stylus assembly 14, which may advantageously include the structural features, which are the subject of U.S. Patent No. 3,236,956. The stylus assembly 14, which is herein shown as the turnover variety, includes a thin forwardly extending stylus rod 14–1, carrying at its front end, two different size styli 11, 11–1. The stylus rod 14–1 is carried in alignment with the central transducer coupling axis by a substantially rigid elongated seating member 14–2. A turnover handle 14–3 laterally extends from stylus holder rotary seating section 14–2 to permit the user to roate the stylus rod 14–1 with its two styli 11, 11–1 to its different or opposite stylus positions. The rear end of stylus holder seating section 14–2 has a flat shaped bias section 14–4, with opposite flat surfaces thereof clamped to overlying housing surface by elastically deformable retainer and bias spring 14–5, the rear end of which is affixed to the overlying bottom surface of housing 15, by the rearward housing rivet 17.

As is the subject of aforementioned Kantrowitz U.S. Pat. No. 3,236,956, a thick elongated elastomer body 14–6 connects the rear end of stylus rod 14–1 to the rigid seating section 14–2 of the stylus holder. An appreciable intermediate non-confined portion 14–7 of the elastomer body is interposed between the nearby ends of stylus rod 14–1 and its seating section 14–2 for enabling extended deflections of the stylus rod from its central coupling axis, so that the stored elastic energy of the flexed intermediate elastomer portion 14–7 shall be sufficient to promptly return the stylus rod 14–1 to the coupling axis.

The novel resolver and force coupler 40 of the instant invention is constructed of a suitable elastomer material (e.g. one of the polypropylene or polyurethane materials), to have the hereinafter defined requisite rigidity of its linkages, but the necessary flexibility of the interconnecting hinge pivot portions. Resolver coupler 40 has at its lower end a central stylus coupling tip or portion 41, with a downwardly facing recess 42 for receiving and holding biased therein the stylus driven rod 14–1 moving in the two inclined stylus motion components 13L, 13R.

The resolver 40 includes a stylus driven portion having a pair of 45° inclined arms 44, which together with their interconnecting portion 41, correspond in function to the conventionally known V-type motion resolver couplers heretofore used. Inclined arms 44 resolve the composite motion imparted to the stylus into their distinct components 13L and 13R.

Connected to the upper end of each of the stylus driven arms 44 is a rigid link 47. Reference will now be made to FIG. 10, which illustrates the novel manner in which each of the links 47 receive the inclined motion components 13L or 13R, and efficiently converts it to transducer drive forces in the direction of 13LT and 13RT. Link 47 is a rigid member having a lower portion 47A, interconnected to arm 44 at reduced cross-sectional hinge pivot region 45. Another portion 47B of the link 47 is interconnected to transducer embracing region 49, by the reduced cross-sectional region of hinge pivot 48. The intermediate region of linkage arm 47 is mounted to a stationary pivot 51. Stationary pivot 51 (as shown in FIGS. 1, 2, 6 and 7), is provided by the central bearing portion 50, having a rearward extension 55, firmly affixed in a recess 55′ of the inward portion of housing body 15. The rearward extension 55 is maintained in the housing body by the clamping force of a projection 16–5 of the housing cover when it is affixed to the housing 15. Alternatively, the bearing portion 50 may be affixed to the housing by cement or other suitable retaining means.

Referring back to FIG. 10, and considering the left-hand channel, input drive force 13L will be imparted to link portion 47A at the hinge pivot coupling region 45 in a manner tending to reciprocate rigid member 47 about stationary pivot 51. Hence, the end of arm 47A at pivot 45 will be urged along the arc segment 45′ having its center at stationary pivot 51. The length $l_1$ of linkage portion 47A is dimensioned sufficiently long such that for the extent of resistively small displacement imparted by the stylus movement, the translation at pivot point 45 will be essentially straight-lined, lying along the tangent 45″ to the arcuate segment 45′. The translation of this linkage in one of its directions is shown by the dash-dotted condition of FIG. 10. As the rigid member 47 is moved about the stationary pivot 51, the arm portion 47B similarly moves about stationary pivot 51. Hinge pivot 48 is located immediately above stationary pivot 51, such that line $l_2$ joining pivots 48 and 51 will be perpendicular to the desired direction 13LT of the transducer driving force. The distance $l_2$ between pivots 48 and 51 is likewise dimensioned sufficiently long such that the movement of pivot 48 about the small segment of arc 48′ will be essentially along a straight line conforming to a tangent to the arcuate segment at point 48. It should be naturally understood that the input force 13L is a vibratory force, hence the end 20–1 of beam transducer 20 will be excited by a vibratory force 13LT directed perpendicular to the extended transducer beam surface. In the same manner that the component 13L of stylus movement imparts the transducer excitation force 13LT, the simultaneous input 13R in the right channel similarly results in a transducer excitation force 13RT being directed against the transducer member of that channel.

It is therefore seen that the orthogonal relationship of arms 44, 47, and the angular relationship of hinge pivot 48 and 45 relative to stationary pivot 51 provides an efficient translation of the 45–45 inclined stylus imparted forces (13L and 13R) to transducer excitation forces (13LT and 13RT) directed in a direction substantially perpendicular to the extended transducer beam surface.

The resolver member 40 is advantageously shown as formed from a single integral molded member. This molded member is formed of an appropriately elastomer material, such as a polypropylene or polyurethane. The material is selected to provide the requisite rigidity of the individual arm 44, 47 while allowing the narrowed regions 45, 48, 51 to provide the requisite flexibility. The rigidity of arms 44 and 47 may preferably be enhanced by the utilization of transverse ribs 44–1 and 47–1 as shown in cross-sectional views 8 and 9. In practice, the linkages will vary from a theoretically exact rigid member. Such variation may be predeterminedly selected as a design consideration, to raise the compliance of the system, thereby lowering the tracking force requirement at the stylus, and providing longer record and stylus wear.

Reference is now made to FIG. 11, which shows another form of the resolver member 140, constructed in accordance with the instant invention. The portions of resolver member 140 which correspond to similar elements of resolver member 40, are similarly numbered in the 100 series to facilitate a comparison between these two embodiments. The stereophonic pickup intended to receive the motion converting resolver 140 includes a pair of parallel orientated beam transducers 120 for independently receiving the inclined forces components 13L, 13R imparted to the stylus rod 114–1, by virtue of the stylus member 111 riding within the grooves of record 12. Resolver 140 includes a V-shaped region having inclined arms 144, interconnected by central region 141, having opening 142 for the reception of the stylus rod 114–1. The rigid linkage member 147 includes a first portion 147A interconnected to arm 144, at hinge pivot 145, and a second portion 147B interconnected to transducer embracing region 149 by virtue of hinge pivot 148. The stationary pivot 151 is provided by a pivot defining surface 152 of the housing cover 116 in the manner of a knife edge support. An inclined force input to linkage member 147 causes movement about stationary pivot 151 such that the linkage portion 147A at hinge pivot 145 moves along a tangent to arc segment 145′. Similarly, link portion 147B at hinge pivot 148 moves along a tangent to arc segment 148′. The lines 1–$l_1$, 1–$l_2$ connecting the hinge pivots 145 and 148, respectively, to the stationary pivot 151 are perpendicular to the desired direction of linkage movement such that the ultimate components of force 13RT and 13LT will be in a direction perpendicular to the surface of the beam transducer 120.

The examples of the invention described above will suggest various modifications thereof which are within the scope of the accompanying claims.

The embodiments of the invention in which an exclusive privilege or property is claimed are defined as follows:

1. In a stereophonic phonograph pickup for playback of two distinct undulations in two inclined groove faces along a flat record surface;

a structural mount;

a stylus carried by said mount and movable by both of said undulations with two distinct corresponding motion components inclined to said record surface;

two distinct laterally displaced elongated flat electromechanical bender-type transducer beams carried by said mount with their respective planes aligned substantially parallel to each other and perpendicular to said record face, each of said transducer beams corresponding to a different of said two stylus motion components and responsive to transducer drive motion substantially perpendicular to said beam plane for supplying a corresponding signal;

the improvement comprising, a motion resolving and motion-direction-changing coupler structure having a stylus coupler portion driven by said stylus with said two inclined motion components and two transducer drive portions each extending from said coupler portion to a different of said transducer beams for transmitting a different of said two motion components to a corresponding different of said transducer beams;

each of said transducer drive portions comprising a first link portion connected with one end to said coupler portion and moving with a corresponding of said inclined motion components in substantially the same direction, and a second link portion connected between said first link portion and said corresponding transducer beam and driven with said inclined motion components; and structural elements associated with said link portions for causing said second link portion to move said corresponding transducer beam in a transducer drive direction substantially perpendicular to said beam plane in response to said inclined components of stylus motion of its said corresponding first link portion.

2. In a stereophonic pickup as claimed in claim 1, said stylus coupler portion and first link portions of said transducer drive portions moving and transmitting forces in directions inclined 45° to the record surface;

said second link portion of said transducer drive portion moving and transmitting transducer drive froces in a horizontal direction substantially parallel to the record surface.

3. In a stereophonic pickup as claimed in claim 2, said pickup structural mount including a main body portion and a cover portion joined along a mating surface;

said body portion including a pair of slots for receiving said elongated flat bender-type transducer beams;

said slots extending in a direction perpendicular to said joining surface.

4. In a stereophonic pickup as claimed in claim 2, further including, stationary bearing pivot means for mounting a region of said transducer drive portion intermediate said first and second link portions;

a first hinge pivot interconnecting said first link portion and said coupler portion;

a second hinge pivot interconnecting said second link portion and said transducer;

said transducer drive portion being formed of a rigid member such that said link portions thereof and hinge pivots move as a unit about said stationary pivot means responsive to an inclined stylus motion input signal;

said hinge pivots operatively positioned relative to said stationary bearing pivot means, such that said second hinge pivot translates in said horizontal transducer drive direction while said first hinge pivot translates in said 45° inclined stylus motion direction.

5. In a stereophonic pickup as claimed in claim 4, said hinge pivots and stationary pivots operatively located such that a line connecting said stationary pivot and said first hinge pivot is perpendicular to said 45° inclined stylus motion direction, and a line connecting said stationary pivot and said second hinge pivot is perpendicular to said horizontal transducer drive direction.

6. In a stereophonic pickup as claimed in claim 1, further including, stationary bearing pivot means for mounting a region of said transducer drive portion intermediate said first and second link portions;

a first hinge pivot interconnecting said first link portion and said coupler portion;

a second hinge pivot interconnecting said second link portion and said transducer;

said transducer drive portion being formed of a rigid member such that said link portions thereof and hinge pivots move as a unit about said stationary pivot means responsive to an inclined stylus motion input signal;

said hinge pivots operatively positioned relative to said stationary bearing pivot means, such that said second hinge pivot translates in said transducer drive direction while said first hinge pivot translates in said inclined stylus motion direction.

7. In a stereophonic pickup as claimed in claim 6, said hinge pivots and stationary pivots operatively located such that a line connecting said stationary pivot and said first hinge pivot is perpendicular to said inclined stylus motion direction, and a line connecting said stationary pivot and said second hinge pivot is perpendicular to said transducer drive direction.

8. In a stereophonic pickup as claimed in claim 4, said structural mount including means for maintaining said bearing pivot stationary with respect to said hinge pivots.

9. In a stereophonic pickup as claimed in claim 4, said motion resolving and motion-direction-changing coupler, including said coupler portion, transducer drive portions and its associated pivots constituting a single structure integrally formed of a polymer substance.

References Cited

UNITED STATES PATENTS 3,102,171 8/1963 Laux ............ 179—100.41

TERRELL W. FEARS, Primary Examiner

R. F. CARDILLO, Jr., Assistant Examiner

U.S. Cl. X.R.

274—37